UNITED STATES PATENT OFFICE.

HEINRICH JORDAN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

AZO DYE.

993,073.  Specification of Letters Patent.  Patented May 23, 1911.

No Drawing.   Application filed February 6, 1911.   Serial No. 606,946.

*To all whom it may concern:*

Be it known that we, HEINRICH JORDAN and WILHELM NEELMEIER, doctors of philosophy, chemists, citizens of the German Empire, residing at Leverkusen, near Cologne, Germany, have invented a New Dye, of which the following is a specification.

The present invention relates to the manufacture and production of new and valuable azo dyestuffs.

The process for their production consists in combining diazo compounds of aromatic amins, such as anilin, anisidin, toluidin, xylidin, cresidin, aminophenols, naphthylamins, naphthylamin sulfonic acids, etc. with aminobenzoylaminobenzoyl-2-amino naphthol-7-sulfonic acids

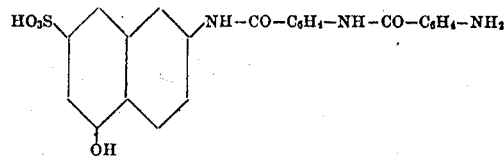

The new dyes are after being dried and pulverized in the shape of their alkalin salts dark powders soluble in water. They yield upon reduction with hydrosulfite an aromatic amin and aminobenzoylaminobenzoyl-2-amino-5-naphthol-6-amino-7-sulfonic acid. They produce on cotton orange-red to bluish-red shades of great purity and of excellent fastness to light. They can be diazotized on the fiber and combined with developers e. g. betanaphthol, shades fast to washing being thus obtained.

In order to illustrate the new process more fully the following example is given, the parts being by weight: 93 parts of anilin are diazotized and the diazo compound is added to a solution of 477 parts of the acid:

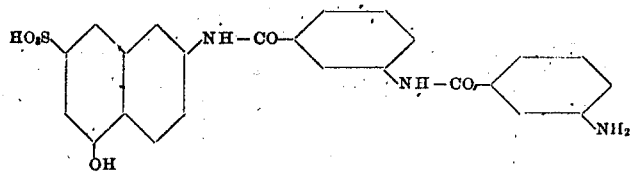

containing 400 parts of sodium carbonate. The dye separates. It is after being dried and pulverized in the shape of its sodium salt a dark powder soluble in water with an orange coloration and soluble in concentrated sulfuric acid with a red coloration. Upon reduction with hydrosulfite it is split up into anilin and meta-aminobenzoylmeta-aminobenzoyl-2-amino - 5-naphthol-6-amino-7-sulfonic acid. It dyes cotton in orange shades, which after being diazotized and developed with beta-naphthol turn more yellowish.

We claim:—

1. The herein described azo dyes obtained from a diazo compound and aminobenzoyl-aminobenzoyl-2-amino - 5 - naphthol - 7 - sulfonic acid, which are in the shape of their alkalin salts after being dried and pulverized dark powders soluble in water; yielding upon reduction with hydrosulfite an aromatic amin and aminobenzoylaminobenzoyl-2-amino-5-naphthol-6-amino-7-sulfonic acid; and dyeing cotton from orange-red to bluish-red shades which can be diazotized on the fiber and combined with beta-naphtnol, substantially as described.

2. The herein described azo dye obtained from diazobenzene and meta-aminobenzoyl-meta-aminobenzoyl - 2 - amino-5-naphthol-7-sulfonic acid, which is after being dried and pulverized in the shape of its sodium salt a dark powder soluble in water with an orange coloration and soluble in concentrated sulfuric acid with a red coloration; yielding upon reduction with hydrosulfite meta-aminobenzoyl-meta-aminobenzoyl-2-amino-5-naphthol-6-amino-7-sulfonic acid; and dyeing cotton orange shades which after being diazotized and developed with beta-naphthol are more yellowish, substantially as described.

In testimony whereof we have hereunto set our hands in the presence of two subscribing witnesses.

HEINRICH JORDAN. [L. S.]
WILHELM NEELMEIER. [L. S.]

Witnesses:
CHAS. J. WRIGHT,
WALTER VONNEGUT.